(12) United States Patent
Abe et al.

(10) Patent No.: US 7,762,229 B2
(45) Date of Patent: Jul. 27, 2010

(54) INTAKE SYSTEM FOR INTERNAL COMBUSTION ENGINE

(75) Inventors: Kazuyoshi Abe, Susono (JP); Daisuke Uchida, Susono (JP); Mitsumasa Yamagata, Toyota (JP); Akira Nakawatase, Toyota (JP); Akio Yoshimatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 394 days.

(21) Appl. No.: 11/887,277

(22) PCT Filed: Mar. 29, 2006

(86) PCT No.: PCT/JP2006/306503

§ 371 (c)(1),
(2), (4) Date: Sep. 27, 2007

(87) PCT Pub. No.: WO2006/106751

PCT Pub. Date: Oct. 12, 2006

(65) Prior Publication Data

US 2009/0272356 A1 Nov. 5, 2009

(30) Foreign Application Priority Data

Apr. 1, 2005 (JP) .............................. 2005-106250

(51) Int. Cl.
*F02B 31/00* (2006.01)
(52) U.S. Cl. ...................................... 123/306; 123/308

(58) Field of Classification Search .................. 123/306, 123/308
See application file for complete search history.

(56) References Cited

U.S. PATENT DOCUMENTS 6,874,465 B2  4/2005  Arimatsu et al.

FOREIGN PATENT DOCUMENTS

| JP | 05-209582 A | 8/1993 |
|----|-------------|--------|
| JP | 06-042435   | 2/1994 |
| JP | 06-159079   | 6/1994 |
| JP | 2004-060461 A | 2/2004 |
| JP | 2004-124836 A | 4/2004 |

*Primary Examiner*—Noah Kamen
(74) *Attorney, Agent, or Firm*—Kenyon & Kenyon LLP

(57) ABSTRACT

In an intake system for an internal combustion engine wherein a partition plate is provided within an intake pipe in a longitudinal direction so that an inside is divided into a first intake passage, which is an upper side passage of the above described intake pipe, and a second intake passage, which is a lower side passage of the above described intake pipe, and an intake control valve for opening and closing the second intake passage is provided, the partition plate has holes which connect the first intake passage to the second intake passage and allow fuel on a lower surface of the partition plate to be sucked out to the first intake passage. When an intense tumble flow is created in the first intake passage in the intake system, an air flow toward the first intake passage from the second intake passage is created in the holes so that the fuel that adheres to the partition plate can be sucked out.

9 Claims, 8 Drawing Sheets

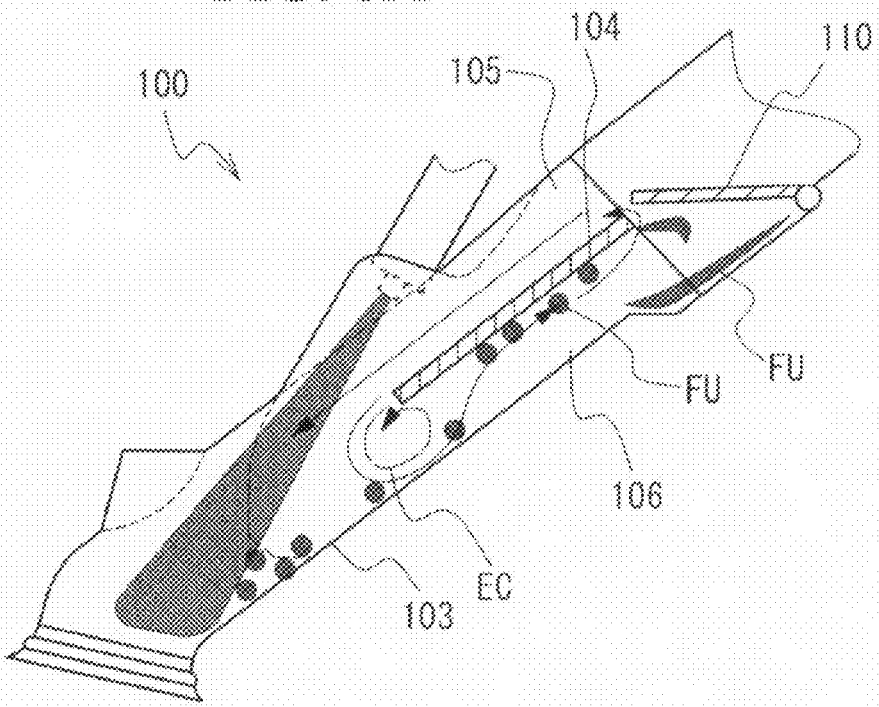
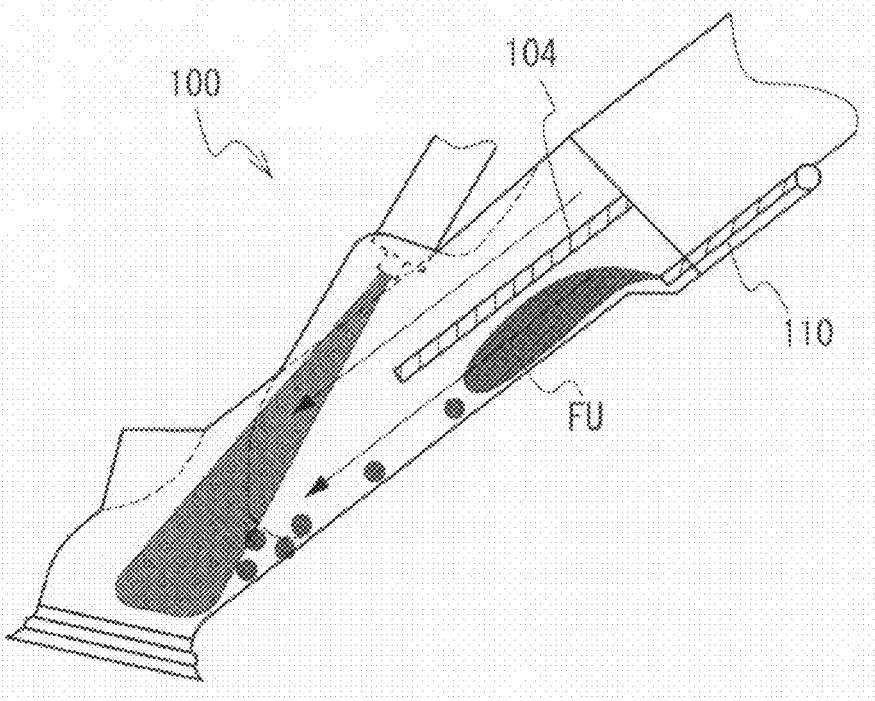

INTAKE SYSTEM FOR INTERNAL COMBUSTION ENGINE

This is a 371 national phase application of PCT/JP2006/306503 filed 29 Mar. 2006, claiming priority to Japanese Patent Application No. 2005-106250 filed 01 Apr. 2005, the contents of which are incorporated herein by reference.

TECHNICAL FIELD

The present invention relates to an intake system for an internal combustion engine where a partition plate is placed within an intake pipe so that the intake flow is controlled.

BACKGROUND ART

A number of conventional intake system where a structure for generating an intense tumble flow is provided within an intake pipe (also referred to as intake port) have been proposed. In Patent Document 1, for example, a partition plate (also referred to as partition wall, separation wall or the like) is placed inside the intake pipe in the longitudinal direction so that the intake pipe is divided into a tumble passage and a control passage. In addition, an intake flow control valve which can be opened and closed is placed on the control passage side, and left and right partition walls are provided on the tumble passage side so that the tumble flow can be stratified. In addition, Patent Document 2 discloses an intake system where a partition plate having at least connecting pores in the portion which injected fuel collides with is used. In this intake system, the portion which injected fuel collides with has an uneven surface and connecting pores so that the dispersion, evaporation and atomization of fuel can be accelerated and liquid dropping of the injected fuel can be prevented, and thus, the combustion can be stabilized. Furthermore, Patent Document 3 discloses an intake system where an intake control valve is placed upstream from a partition wall, which divides the inside of an intake port into two passages, and connecting passages in slit form are provided in the partition wall. The above described connecting passages are provided on the upstream end side of the partition wall so that they face a local low pressure region which is created on the downstream side when the intake control valve is closed. In the intake system of Patent Document 3, the second passage on the lower side is closed with the intake control valve when a tumble flow is created, and thus, an intake flow is created in the first passage on the upper side. At this time, an intake flow for taking air from the second passage to the first passage is created in the above described connecting passage so that the tumble flow can be intensified.

Patent Document 1: Japanese Patent Application Publication No. 06-159079

Patent Document 2: Japanese Patent Application Publication No. 05-209582

Patent Document 3: Japanese Patent Application Publication No. 2004-124836

DISCLOSURE OF THE INVENTION

Problems to be Solved by the Invention

In the intake system disclosed in the above described Patent Document 1, fuel is injected on the tumble passage side and the intake flow after passing through the partition plate includes fuel and flows into a combustion chamber. FIG. 8A schematically shows an intake system 100 at this time. In the intake system 100, the inside of an intake pipe 103 is divided into a tumble passage 105 and a control passage 106 by a partition plate 104. FIG. 8A shows an intake system when the control passage 106 side is closed by moving an intake flow control valve 110, generating an intense tumble flow in the tumble passage 105. In this case, a part of the intake flow after passing through the partition plate 104 may become an intense eddy flow EC at the lower end. This eddy flow EC flows back through the control passage 106 so as to make fuel FU adhere to the lower surface of the partition plate 104 in liquid drop form. In addition, when the intake valve (not shown) in the upper portion of a cylinder opens, the backflow may become fuel FU adhere to the lower surface of the partition plate 104.

Fuel FU that has flowed back or been blown back stays on the lower surface of the partition plate 104 or in a recess of the peripheral portion. When the intake flow control valve 110 is switched to open (particularly, fully open) while the injected fuel stays on the control passage 106 side as described above, fuel FU in liquid drop form immediately flows into the combustion chamber as shown in FIG. 8B, and therefore, the air fuel ratio (A/F) suddenly becomes rich. This change is so sudden that it is extremely difficult to control the air fuel ratio. Therefore, the efficiency of combustion lowers and emission deteriorates in the internal combustion engine.

In addition, the partition plate in the intake system disclosed in Patent Document 2 is formed of a material where the portion which injected fuel collides with is in uneven form and has connecting pores which connect the front to the rear. In addition, it is proposed that a foam metal material be used as the material having connecting pores. When the inside of the intake pipe is partitioned with a material having connecting pores, however, the tumble passage and the control passage connect over a wide range, and therefore, the effects of providing the partition plate are reduced. Accordingly, it becomes difficult to create an intense tumble flow on the tumble passage side in this intake system. In addition, when such a material as foam metal is used for the partition plate, the fuel may clog in the middle or the fuel cannot be sucked out well due to the passage being complicated. In addition, in such an intake system, a special material is used, making the manufacturing cost high. Furthermore, in such an intake system, a technology for accelerating the evaporation and atomization of fuel injected from an injector has been proposed, and thus, no measures have been taken for the fuel that adheres to the lower surface of the partition plate due to the backflow or the like of the intake flow as described above.

Furthermore, in the intake system disclosed in Patent Document 3, intake air is taken from the second passage to the first passage via the connecting passage when a tumble flow is created. At this time, the intake flow refluxes (flows backwards) from the bottom to the top within the second passage. The fuel injected along with this reflux flows backwards, and therefore, fuel stays on the lower surface of the partition wall or in the peripheral portion in the same manner as in the above described system of Patent Document 1. In particular, the connecting passages are provided at the upstream end of the partition wall so that they face the low pressure region created when the intake control valve is closed, and therefore, the fuel easily adheres to the entirety of the lower surface of the partition wall. In addition, there is a possibility that the fuel may flow backwards to a location close to the intake control valve and stay in a recess in the peripheral portion. Accordingly, there is a concern in the internal combustion engine where this intake system is adopted that the efficiency of combustion may lower and emission may deteriorate.

Accordingly, an object of the present invention is to provide an intake system where the intake flow can be prevented from refluxing up to the peripheral portion of the intake control valve and the fuel can be prevented from adhering to the lower surface of the partition plate, and thus, increase in the efficiency of combustion and improvement in emission can be achieved.

Means for Solving the Problem

The above described object is achieved by introducing an intake system for an internal combustion engine wherein a partition plate is provided within an intake pipe in the longitudinal direction so that the inside is divided into a first intake passage, which is an upper side passage of the above described intake pipe, and a second intake passage, which is a lower side passage of the above described intake pipe, and an intake control valve for opening and closing the above described second intake passage is provided, and the above described partition plate has holes which connect the above described first intake passage to the above described second intake passage and allow fuel on the lower surface of the above described partition plate to be sucked out to the above described first intake passage.

According to the present invention, the partition plate has holes for connecting the first intake passage to the second intake passage, and therefore, when an intense intake flow (tumble flow) is created in the first intake passage, an air flow toward the first intake passage from the second intake passage is created in the above described holes so that the fuel that adheres to the partition plate can be sucked out. Accordingly, the fuel that has been converted to liquid drops can be prevented from suddenly flowing into the internal combustion engine, and thus, an intake system can be provided where increase in the efficiency of combustion and improvement in emission can be achieved.

In addition, the intake system for an internal combustion engine may have a structure such that the location of the openings of the above described holes on the above described first intake passage side may be downstream from the location of the openings of the above described holes on the above described second intake passage side in the direction of the intake flow. In addition, the intake system for an internal combustion engine may have a structure such that the location of the openings of the above described holes on the above described first intake passage side may be upstream from the location of the openings of the above described holes on the above described second intake passage side in the direction of the intake flow.

In addition, the intake system for an internal combustion engine may have a structure such that the end portion on the downstream side of the above described holes on the above described second intake passage side may be downstream from the end portion on the downstream side of the above described holes on the above described first intake passage side in the direction of the intake flow.

In addition, it is desirable for the diameter of the openings of the above described holes created on the above described first intake passage side to be smaller than the diameter of the openings of the above described holes created on the above described second intake passage side. In addition, it is preferable for the above described holes to adopt a structure in taper form where the diameter increases toward the above described second intake passage side from the above described first intake passage side. Furthermore, the above described holes may adopt a structure where the holes are provided on the downstream side of the above described partition plate. In this manner, the holes are provided mainly on the downstream side of the partition plate, and thus, the range of reflux can be narrowed even if the reflux is created within the second passage, and the fuel can be prevented from flowing backwards up to the upstream intake control valve. Here, it is preferable to adopt a flat plate member as the above described partition plate. In the case where the partition plate is flat, pressure loss is small, and therefore, the intake flow becomes smooth in the vicinity thereof.

EFFECTS OF THE INVENTION

According to the present invention, an intake system can be provided where the intake flow can be prevented from refluxing up to the peripheral portion of the intake control valve and fuel can be prevented from adhering to the lower surface of the partition plate, and thus, increase in the efficiency of combustion and improvement in emission can be achieved.

BRIEF DESCRIPTION OF THE DRAWINGS

FIG. 1A is a view showing the entire configuration of the intake system and FIG. 1B is a view showing an enlarged portion within CR of FIG. 1A;

FIGS. 8A and 8B are views showing an intake system according to the prior art.

BEST MODES FOR CARRYING OUT THE INVENTION

In the following, an intake system for an internal combustion engine according to the embodiments of the present invention is described with reference to the drawings.

FIRST EMBODIMENT

Figure 1A:
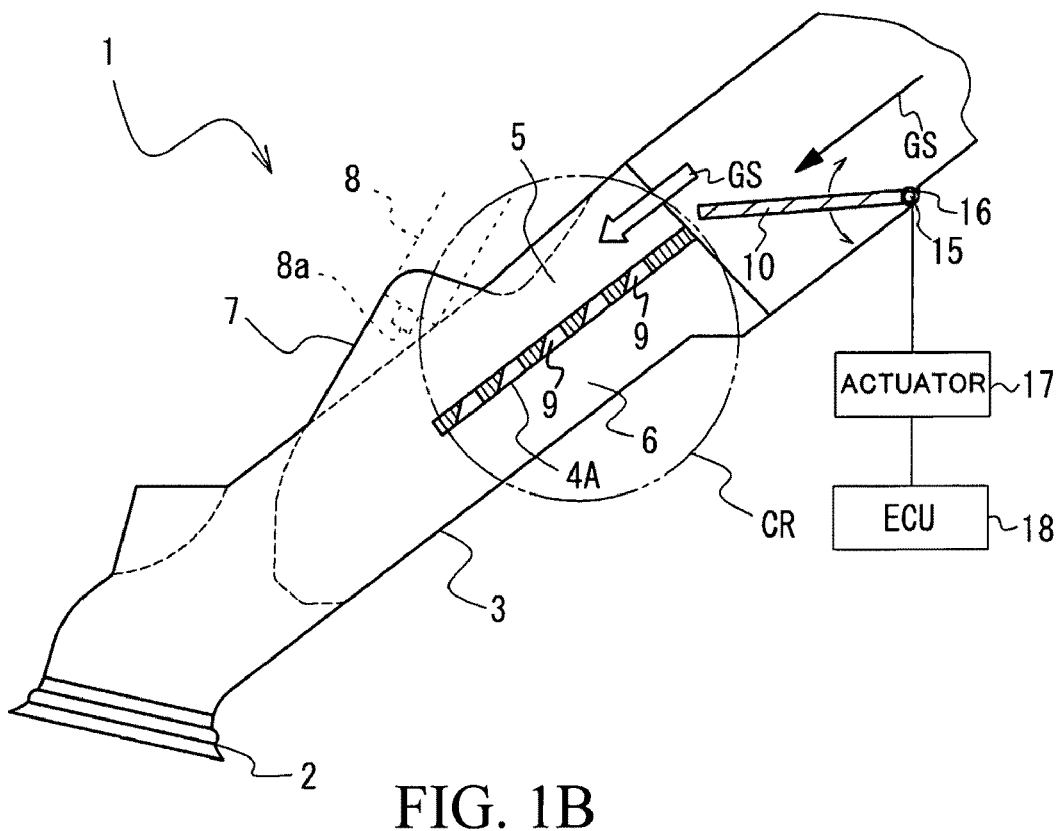
FIGS. 1A and 1B are views showing an intake system according to the first embodiment.
Figure 1B:
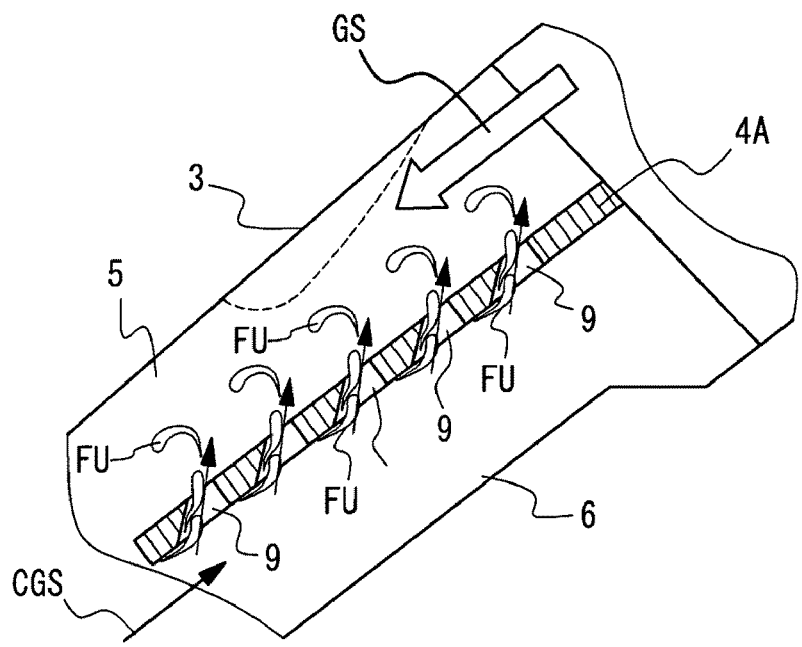

FIGS. 1A and 1B are views showing an intake system 1 according to the first embodiment. FIG. 1A is a view showing the entirety of the configuration of the intake system 1, and FIG. 1B is a view showing an enlarged portion within CR of FIG. 1A. The intake system 1 is provided in a portion for connecting the cylinder side of an internal combustion engine, not shown, to an intake manifold. In FIG. 1A, the end portion 2 on the lower side is the cylinder side of the intake system 1. The intake flow GS is created in the direction toward the cylinders from the intake manifold side, as shown in the figure. Here, though in many cases, the intake pipe of an intake system is formed within the cylinder head of the internal combustion engine, the intake system according to the present invention is not limited to having such a general structure. The intake pipe may be a part of the intake manifold, or may have such a form as to be an independent pipe.

The location in which the intake pipe is provided is not particularly limited in the below described embodiments.

A partition plate 4A is placed inside the intake pipe 3 in the longitudinal direction. This partition plate 4A divides the inside of the intake pipe 3 into a first intake passage 5, which is an upper side passage, and a second intake passage 6, which is a lower side passage. An portion for attaching an injector 7 is formed in an upper portion of the first intake passage 5 so as to protrude to the outside, and fuel is injected into the intake pipe 3 from an end portion 8a of an injector 8 inserted into this portion for attaching an injector 7. Accordingly, the intake flow GS beyond this becomes mixed air including fuel.

An opening and closing valve 10 is placed upstream side from the partition plate 4A (on the intake manifold side) as an intake control valve. This opening and closing valve 10 moves around a support shaft 15, which is provided on the inner wall of the intake pipe 3. In the example shown in the figure, the support shaft 15 is provided on the wall surface on the second intake passage 6 side. This support shaft 15 is supported by a bearing 16. In addition, the force for movement is conveyed to the support shaft 15 from an actuator 17. The driving of the actuator 17 is controlled by an ECU (electronic control unit) 18. This ECU 18 may be the same ECU as that which controls the internal combustion engine, not shown. In this case, the opening and closing valve 10 can be moved to a desired location by controlling the actuator 17 in accordance with the state of the internal combustion engine.

When the second intake passage 6 is closed and only the first intake passage 5 is open by the opening and closing valve 10, as shown in FIG. 1A, a tumble flow, which is more intense than in the case of the fully open state, can be created within the first intake passage 5. Here, the state shown in this FIG. 1A is referred to as semi-open state. The state where the opening and closing valve 10 has moved to be parallel to the wall surface of the intake pipe 3 so that the first intake passage 5 and the second intake passage 6 are open is referred to as fully open state. In addition, in this intake system 1, the first intake passage 5 is a tumble passage and the second intake passage 6 is a control passage. Though the above described opening and closing valve 10 is formed so as to be large enough to control the intake flow in the first intake passage 5, it may be formed so as to be small enough to control only the intake flow into the second intake passage 6.

In FIG. 1B, the cross sectional form of holes 9 created in the partition plate 4A can be confirmed. In addition, this figure schematically shows the movement of fuel FU, which adheres to the lower surface of the partition plate 4A due to the intake flow CGS that flows backwards. A plurality of holes 9 are created in the partition plate 4A. A plurality of the holes 9 are created so as to connect the first intake passage 5 to the second intake passage 6. The diameter of the openings of the holes 9 created in the partition plate 4A is greater in the second intake passage 6 than in the first intake passage 5.

Figure 2A:
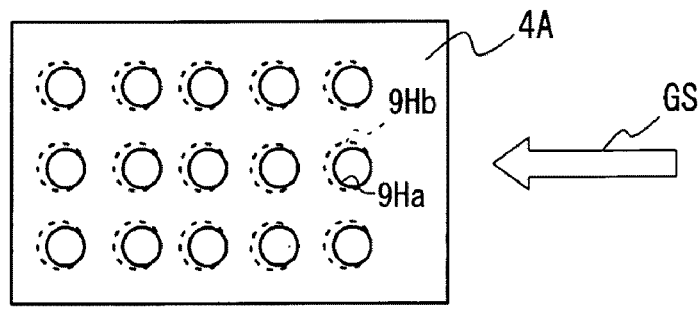
FIG. 2A is a plan view showing a partition plate.
Figure 2B:
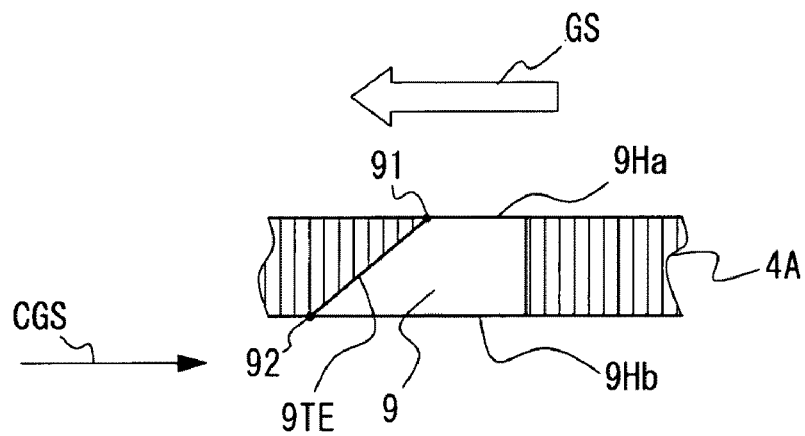
FIG. 2B is a view showing one enlarged hole shown in FIG. 1B.

FIG. 2A is a plan view showing the partition plate 4A (plan view as viewed from the top, from the first intake passage 5 side). Openings 9Ha of the holes 9 created on the first intake passage 5 side are shown by solid lines, while openings 9Hb of the holes 9 created on the second intake passage 6 side are shown by dotted lines. FIG. 2B is a view showing one further enlarged hole from among the holes 9 shown in FIG. 1B. In these views, it can be confirmed that the diameter of the openings on the second intake passage 6 side is greater than the diameter of the openings on the first intake passage 5 side. In the case where the openings of the holes on the lower surface side of the partition plate 4A are great, as described above, it is easy to guide fuel FU that adheres to the lower surface of the partition plate 4A into the holes 9. In addition, when the openings on the first intake passage 5 side are small, as described above, it is difficult for intake flow GS to flow from the first intake passage 5 side to the second intake passage 6 side, and therefore, fuel FU can be sucked out to the first intake passage 5 side without the tumble ratio lowering.

In particular, as shown in FIG. 2B, the end portion 92 on the downstream side of the holes 9 on the second intake passage 6 side is located downstream from the end portion 91 on the downstream side on the first intake passage 5 side in the direction of the intake passage GS. The structure where the end portion of the holes on the lower surface side is shifted to the downstream side as described above also makes it easy to guide adhering fuel into the holes 9. Furthermore, it is preferable that an inner wall 9TE of the holes 9 is in taper form, as shown in the figure, because entering fuel can be smoothly guided to the opposite side.

Figure 2C:
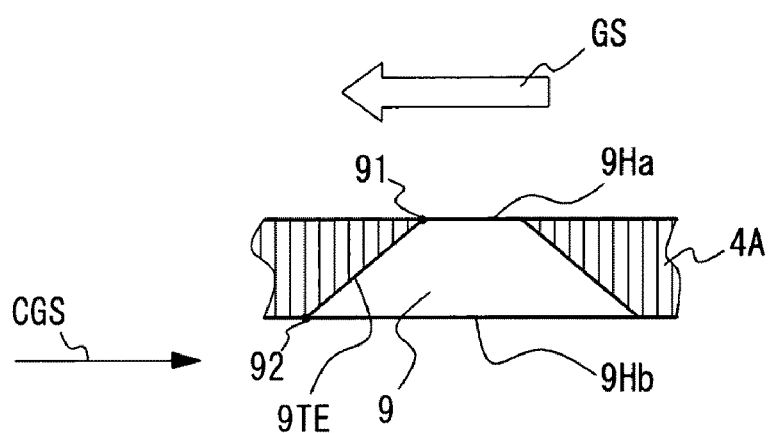
FIG. 2C is a view showing an example of a hole of which the diameter expands uniformly.

Though FIGS. 2A and 2B illustrate a case where the form of the holes (form of the openings) on the first intake passage 5 side and the form of the holes on the second intake passage 6 side are circular and the end portion 92 on the downstream side on the second intake passage 6 side is shifted downstream, the invention is not limited to this. The form of the holes 9 may be, for example elliptical, in slit form or the like. In addition, the holes may be in different forms, such that the holes on the first intake passage 5 side are in circular form and the holes on the second intake passage 6 side are in elliptical form. Furthermore, as shown in FIG. 2C, the holes 9 may be in taper form where the diameter uniformly expands toward the second intake passage 6 side from the first intake passage 5 side. The holes 9 in the partition plate 4A according to this first embodiment are created in such a manner that the area of the openings on the second intake passage 6 side is greater than that on the first intake passage 5 side, and the end portion 92 on the downstream side is downstream from the end portion 91 on the downstream side on the first intake passage 5 side. It is desirable to use a flat plate member for the above described partition plate 4A. As this partition plate 4A, a metal plate having a predetermined thickness of which the surface has a smooth finish, for example, can be used. Punching may be carried out in desired locations on this metal plate, so that a plurality of holes 9 in taper form are provided, and thus, this metal plate can be used as a partition plate 4A. When the partition plate 4A is flat, pressure loss can be kept small, so that the intake flow in the vicinity thereof can be made smooth.

In the above described intake system 1 according to the first embodiment, when an intake flow GS is created in the semi-open state shown in FIG. 1A, an intense flow is created on the first intake passage 5 side, and therefore, there is a difference in pressure, such that the first intake passage 5 has lower pressure than the second intake passage 6. At this time, air flow is created from the second intake passage 6 side to the first intake passage 5 side, and therefore, fuel FU that adheres to the lower surface of the partition plate 4A is sucked out to the upper side (first intake passage 5 side) through the holes 9. Fuel FU that is sucked out to the first intake passage 5 side is again conveyed toward the cylinders by the intense intake flow on the first intake passage 5 side. In particular, according to the present first embodiment, the area of the openings of the holes on the second intake passage 6 side is larger and the end portion 92 on the downstream side is downstream from the end portion 91 on the downstream side on the first intake passage 5 side, and therefore, fuel FU that adheres to the lower surface of the partition plate 4A can be sucked out efficiently to the upper side.

As is clear from the above description, in the intake system 1 according to the first embodiment, fuel that adheres to the lower surface of the partition plate 4A can be sucked out to the upper surface side so as to return to the intake flow, and therefore, the fuel can be prevented from staying on the second intake passage 6 side, which is a control passage. Here, in the partition plate 4A of the intake system 1, a punching or the like is carried out on a metal plate or the like so that the first intake passage 5 and the second intake passage 6 are partially connected, and holes 9 are arranged in such a manner that the tumble flow created in the first intake passage 5, which becomes a tumble passage, is not weakened. Accordingly, using this intake system 1, increase in the efficiency of combustion and improvement of emission can be achieved in the internal combustion engine. In addition, A/F can be stabilized in this intake system 1, and therefore, the torque of the internal combustion engine can be prevented from fluctuating, so that stable output can be gained. Here, when the intake system 1 is in a semi-open state or fully open state, so that the intake air flows from the second intake passage 6 to the first intake passage 5 through the holes 9 in the partition plate 4A, the intake flow in the first intake passage 5 can be biased toward the upper surface side of the intake pipe 3. As a result, the tumble ratio can be increased, and therefore, further increase in fuel efficiency can be achieved as secondary effects of providing holes 9 in the internal combustion engine.

SECOND EMBODIMENT

Figure 3A:
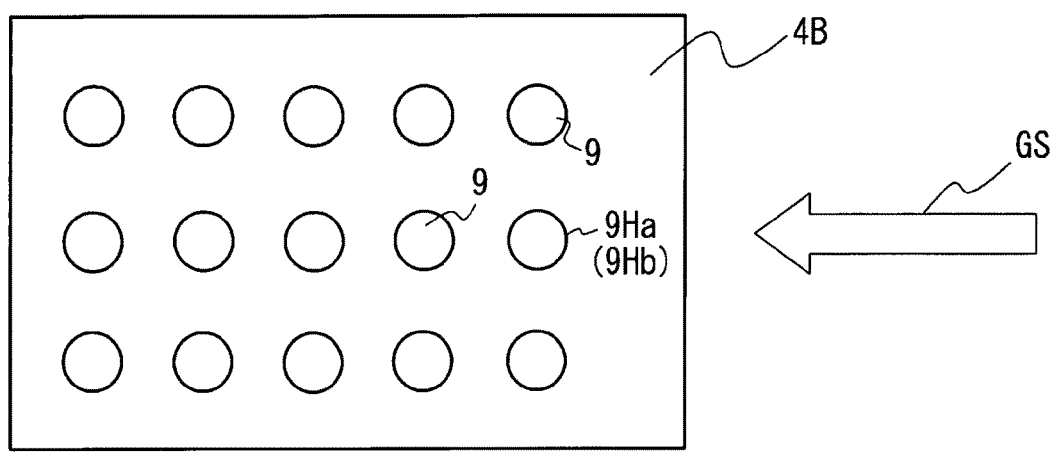
FIGS. 3A and 3B are views showing a partition plate according to the second embodiment.
Figure 3B:
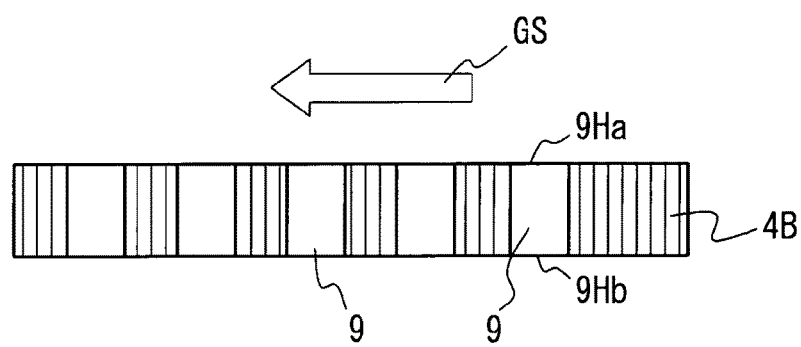

FIGS. 3A and 3B are views showing another partition plate 4B used in the intake system 1 according to the second embodiment. FIG. 3A is a plan view showing the partition plate 4B, and FIG. 3B is a side view. This partition plate 4B is provided with holes 9 which are created approximately perpendicular to the direction of the intake flow GS. The openings 9Ha of these holes 9 on the first intake passage 5 side and the openings 9Hb on the second intake passage 6 side are approximately the same, and the holes 9 are created so as to have approximately the same diameter.

In the intake system 1, where a partition plate 4B having holes 9 in a simple form is adopted as described above, fuel that adheres to the lower surface can be sucked out to the upper surface side so as to return to the intake flow, and therefore, fuel can be prevented from staying on the control passage side. Accordingly, using this intake system 1 also, increase in the efficiency of combustion and improvement of emission can be achieved in the internal combustion engine, and in addition, the torque of the internal combustion engine can be prevented from fluctuating, so that stable output can be gained.

THIRD EMBODIMENT

Figure 4A:
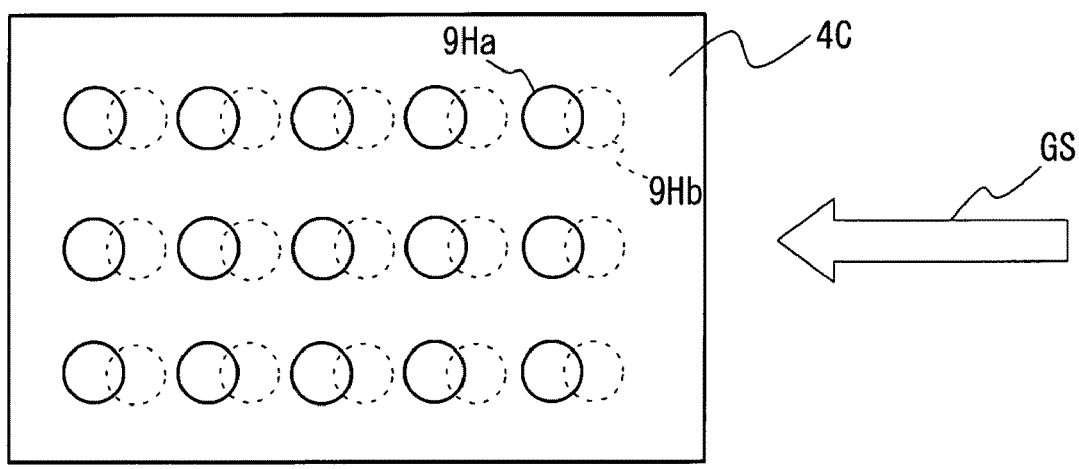
FIGS. 4A and 4B are views showing a partition plate according to the third embodiment.
Figure 4B:
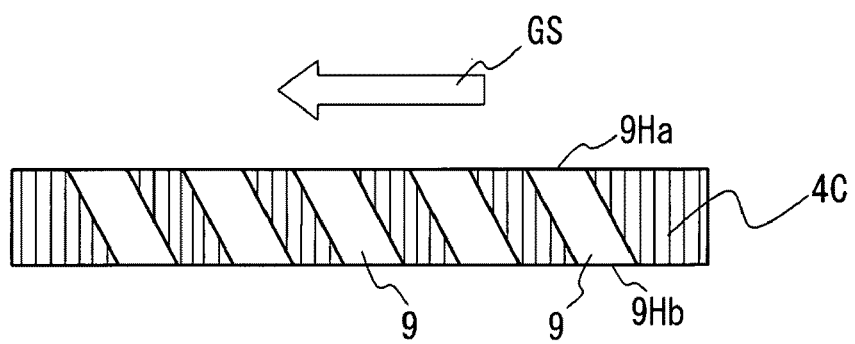

FIGS. 4A and 4B are views showing another partition plate 4C used in the intake system 1 according to the third embodiment. FIG. 4A is a plan view showing the partition plate 4C, and FIG. 4B is a side view. The openings 9Ha of the holes 9 created on the first intake passage 5 side are shown by solid lines, and the openings 9Hb of the holes 9 created on the second intake passage 6 side are shown by dotted lines. The holes 9 are created in this partition plate 4C in such manner that the location of the openings on the first intake passage 5 side is downstream from those on the second intake passage 6 side in the direction of the intake flow GS. In addition, these holes 9 are created so as to have approximately the same diameter.

When the partition plate 4C shown in FIGS. 4A and 4B is adopted, it is difficult for the intake air to flow from the first intake passage 5 to the second intake passage 6 when the valve is in a semi-open state, and therefore, an intense tumble flow can be secured on the first intake passage 5 side. As a result, fuel that adheres to the lower surface of the partition plate 4C can be sucked out to the upper surface side, in the same manner as in the case of the first embodiment. Accordingly, using the intake system 1 which adopts this partition plate 4C, increase in the efficiency of combustion and improvement in emission can be achieved in the internal combustion engine.

FOURTH EMBODIMENT

Figure 5A:
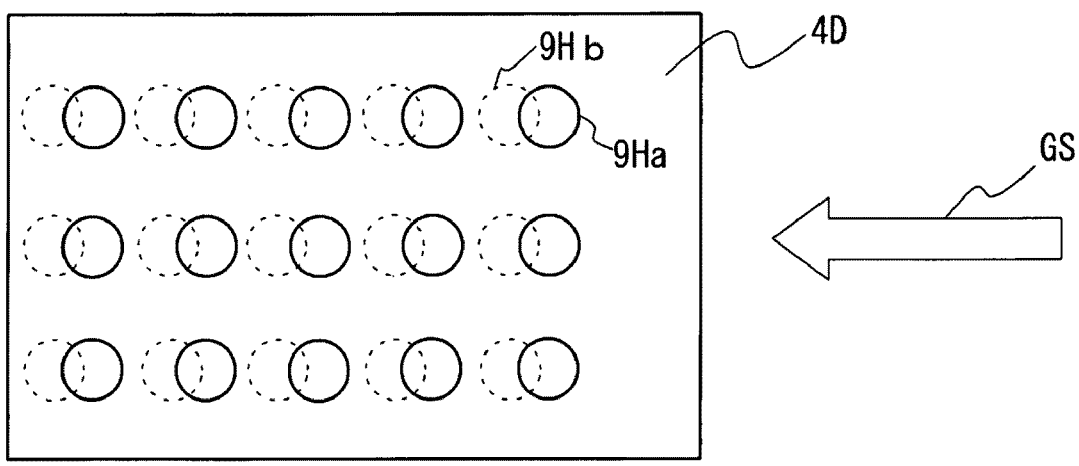
FIGS. 5A and 5B are views showing a partition plate according to the fourth embodiment.
Figure 5B:
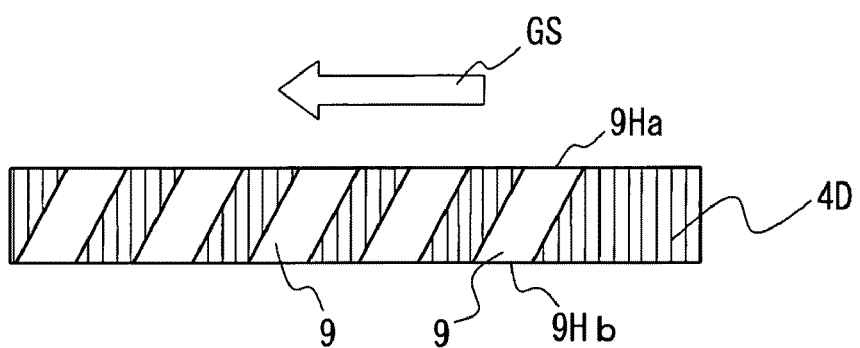

FIGS. 5A and 5B are views showing another partition plate 4D used in the intake system 1 according to the fourth embodiment. FIG. 5A is a plan view showing the partition plate 4D, and FIG. 5B is a side view. The openings 9Ha of the holes 9 created on the first intake passage 5 side are shown by solid lines, and the openings 9Hb of the holes 9 created on the second intake passage 6 side are shown by dotted lines. The holes 9 are created in this partition plate 4D in such manner that the location of the holes on the second intake passage 6 side is downstream from those on the first intake passage 5 side in the direction of the intake flow GS. In addition, these holes 9 are created so as to have approximately the same diameter.

When the partition plate 4D shown in FIGS. 5A and 5B is adopted, the intake air flows smoothly from the second intake passage 6 to the first intake passage 5 when the valve is in a semi-open state, and therefore, fuel that adheres to the lower surface of the partition plate 4D can be sucked out to the upper surface side, in the same manner as in the case of the first embodiment. Accordingly, using the intake system 1 which adopts this partition plate 4D, increase in the efficiency of combustion and improvement in emission can be achieved in the internal combustion engine.

(Modification)

Figure 6:
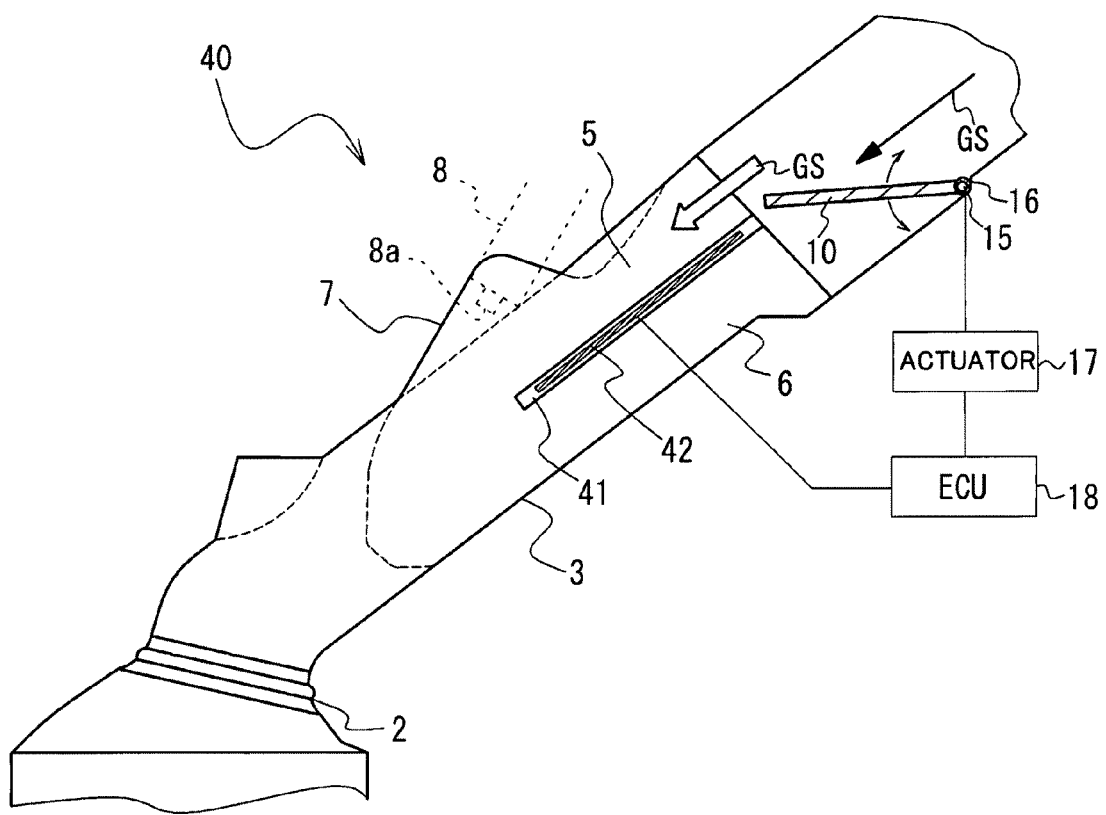
FIG. 6 is a view showing the entirety of the structure of an intake system according to a modification.

FIG. 6 is a view showing the entirety of the configuration of an intake system 40 according to a modification. In order to avoid a duplicate description, the same symbols are attached to the same portions of the intake system 1 shown in the first embodiment. The intake system 40 is provided with a partition plate 41 in which a heater 42 is buried inside. In this manner, a partition plate 41 having a heater 42, which works as a heating means, may be adopted so that the evaporation of the fuel that adheres can be accelerated. Here, in this intake system 40, the energization of the heater 42 may be controlled by an ECU 18 so that no fuel adheres to the lower surface of the partition plate 41 before an opening and closing valve 10 is switched to open. Though FIG. 6 shows an example of the structure where a heater 42 is provided in a partition plate 41 having no holes, a structure where a heater is additionally provided to a partition plate having holes, as those illustrated in the first to fourth embodiments, may be adopted.

In the intake system 40 according to the modification, fuel can be prevented from adhering to the lower surface of the partition plate 41, and therefore, increase in the fuel efficiency and improvement in emission can be achieved in the internal combustion engine in the same manner as in the intake system 1 according to the above described other embodiments.

In addition, according to the above described first to fourth embodiments, cases where holes 9 in various forms are arranged approximately uniformly in a partition plate 4 (4A to 4D) are illustrated. The structure where holes 9 are provided in the partition plate in this manner allows reflux (backflow) within the second intake passage 6, even when it occurs, to be gradually weakened due to the effects of sucking out the air resulting from providing the holes 9 (intake effects). Thus, fuel can be prevented from reaching the periphery of the opening and closing valve 10, which is located upstream, and therefore, no fuel stays in a recess portion of the opening and closing valve 10. Accordingly, the air can be prevented from becoming rich suddenly (temporarily) when the valve is fully open.

Figure 7A:
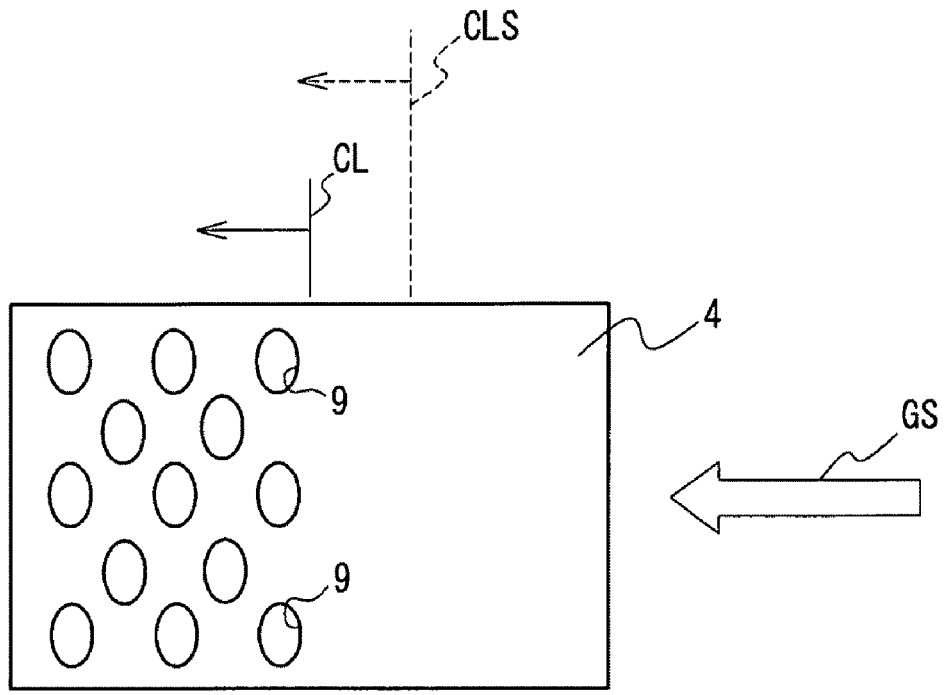
FIGS. 7A and 7B are views showing the arrangement of holes provided in a partition plate according to other examples.
Figure 7B:
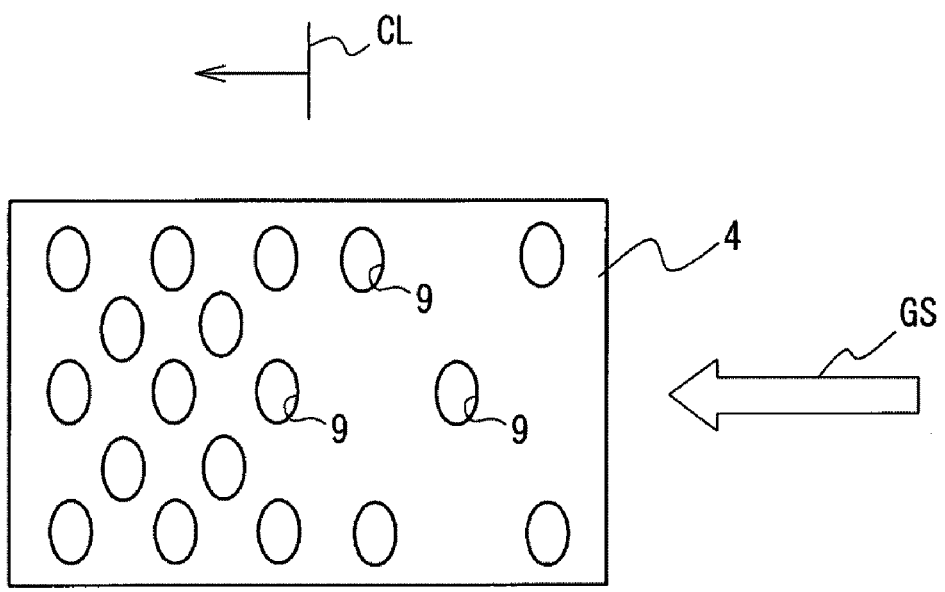

Here, it is not essential for the holes 9 provided in the partition plate 4 to be arranged uniformly. This point is further described in the following. FIGS. 7A and 7B show the arrangement of holes 9 provided in a partition plate 4 according to other examples. FIG. 7A shows an example in the case where holes 9 are collectively arranged downstream from the center location CL of the partition plate 4. In the case where the partition plate 4 having this structure is adopted, the reflux that is created downstream from the partition plate 4 can be cancelled out due to the intake effects of the provided holes 9. Thus, the range of the reflux can be narrowed so that fuel can be prevented from flowing backwards. Here, the arrangement of holes 9 shown in FIG. 7A can be applied to any of the partition plates 4A to 4D shown in the above described first to fourth embodiments. Thus, FIG. 7A shows a partition plate 4 which has no differences between 4A to 4D.

Furthermore, in terms of the arrangement of holes 9 downstream from the partition plate 4, though FIG. 7A illustrates a case where holes 9 are arranged downstream from the center location CL, the invention is not limited to this arrangement. Holes 9 may be arranged downstream from, for example, the location CLS, which is ⅔ of the way from the downstream side of the partition plate. In short, the arrangement of holes 9 may be relatively biased toward the downstream side in comparison with the case where the holes 9 are arranged uniformly in the partition plate 4. According to such a design, the range of reflux is biased toward the downstream side in comparison with the case of uniform arrangement so that the range can be essentially narrowed. Thus, as shown in FIG. 7B a partition plate 4 having a structure where the density of holes 9 downstream from the center location CL is higher than that of holes upstream may be adopted.

Though the preferred embodiments of the present invention are described in detail above, the present invention is not limited to specific embodiments, but rather various changes and modifications can be made within the scope of the gist of the present invention.

The invention claimed is:

1. An intake system for an internal combustion engine, wherein a partition plate is provided within the intake pipe in a longitudinal direction so that an inside is divided into a first intake passage, which is an upper side passage of the intake pipe, and a second intake passage, which is a lower side passage of the intake pipe, and an intake control valve for opening and closing the second intake passage is provided,
   wherein the partition plate has holes which connect the first intake passage to the second intake passage and allow fuel on the lower surface of the partition plate to be sucked out to the first intake passage,
   wherein a diameter of the openings of the holes created on the first intake passage side is smaller than a diameter of the openings of the holes created on the second intake passage side; and
   the holes are in taper form of which the diameter expands toward the second intake passage side from the first intake passage side.

2. The intake system for an internal combustion engine according to claim 1, wherein an end portion on the downstream side of the holes on the second intake passage side is downstream from the end portion on the downstream side of the holes on the first intake passage side in the direction of the intake flow.

3. The intake system for an internal combustion engine according to claim 1, wherein the partition plate is a flat plate member that has a smooth surface.

4. The intake system for an internal combustion engine according to claim 1, wherein an injector having a fuel-injecting portion is attached to the intake pipe,
   wherein the fuel-injecting portion protrudes in the intake pipe; and
   the partition plate has an extended portion that is upstream from the fuel-injecting portion in a direction of the intake flow and further having the holes in the extended portion.

5. An intake system for an internal combustion engine, comprising a partition plate provided within the intake pipe in a longitudinal direction so that an inside of the intake pipe is divided into a first intake passage, which is an upper side passage of the intake pipe, and a second intake passage, which is a lower side passage of the intake pipe, and an intake control valve for opening and closing the second intake passage is provided,
   wherein the partition plate has holes which connect the first intake passage to the second intake passage and allow fuel on the lower surface of the partition plate to be sucked out to the first intake passage, and
   wherein a diameter of the openings of the holes is the same from the first intake passage side to the second intake passage side.

6. The intake system for an internal combustion engine according to claim 5, wherein a location of openings of the holes on the first intake passage side is downstream from the location of the openings of the holes on the second intake passage side in a direction of the intake flow.

7. The intake system for an internal combustion engine according to claim 5, wherein a location of the openings of the holes on the first intake passage side is upstream from the location of openings of the holes on the second intake passage side in the direction of the intake flow.

8. The intake system for an internal combustion engine according to claim 5, wherein the partition plate is a flat plate member that has a smooth surface.

9. The intake system for an internal combustion engine according to claim 5, wherein an injector having a fuel-injecting portion is attached to the intake pipe, wherein the fuel-injecting portion protrudes in the intake pipe; and
   the partition plate has an extended portion that is upstream from the fuel-injecting portion in a direction of the intake flow and further having the holes in the extended portion.

* * * * *